United States Patent
Yanai et al.

(10) Patent No.: US 6,558,758 B1
(45) Date of Patent: *May 6, 2003

(54) LIQUID CRYSTAL COMPOSITION AND LIQUID CRYSTAL DISPLAY ELEMENT

(75) Inventors: Motoki Yanai, Chiba (JP); Yasuhiro Kubo, Chiba (JP); Etsuo Nakagawa, Chiba (JP)

(73) Assignee: Chisso Corporation, Osaka (JP)

( * ) Notice: Subject to any disclaimer, the term of this patent is extended or adjusted under 35 U.S.C. 154(b) by 38 days.

This patent is subject to a terminal disclaimer.

(21) Appl. No.: 09/679,304

(22) Filed: Oct. 6, 2000

(30) Foreign Application Priority Data

Oct. 13, 1999 (JP) .............................. 11-290833

(51) Int. Cl.[7] .................. C09K 19/34; C09K 19/30; C09K 19/12; C09K 19/20
(52) U.S. Cl. .............. 428/1.1; 252/299.61; 252/299.63; 252/299.66; 252/299.67
(58) Field of Search ....................... 428/1.1; 252/299.61, 252/299.63, 299.66, 299.67

(56) References Cited

U.S. PATENT DOCUMENTS

| | | |
|---|---|---|
| 5,198,149 A | 3/1993 | Reiffenrath et al. |
| 5,204,019 A | 4/1993 | Reiffenrath et al. |
| 5,209,866 A | 5/1993 | Reiffenrath et al. |
| 5,211,878 A | 5/1993 | Reiffenrath et al. |
| 5,236,620 A | 8/1993 | Reiffenrath et al. |
| 5,273,680 A | 12/1993 | Gray et al. |
| 5,279,764 A | 1/1994 | Reiffenrath et al. |
| 5,599,480 A | 2/1997 | Tarumi et al. |
| 6,395,353 B2 * | 5/2002 | Yanai et al. .................. 428/1.1 |

FOREIGN PATENT DOCUMENTS

| | | |
|---|---|---|
| DE | 3906021 | 9/1989 |
| DE | 3906038 | 9/1989 |
| DE | 3906040 | 9/1989 |
| DE | 3906052 | 9/1989 |
| DE | 3906058 | 9/1989 |
| DE | 3906059 | 9/1989 |
| DE | 3839213 | 5/1990 |
| EP | 967261 | * 12/1999 |
| WO | 89/08633 | 9/1989 |

* cited by examiner

Primary Examiner—Shean C. Wu
(74) Attorney, Agent, or Firm—Wenderoth, Lind & Ponack, L.L.P.

(57) ABSTRACT

The present invention provides a liquid crystal composition with the characteristics satisfying various properties required for AM-LCD and having a suitable value of αn in compliance with a cell thickness, particularly a negative and absolutely large value of dielectric anisotropy, comprising, as a first component, at least one compound selected from the compounds expressed by the general formula (I), and, as a second component, at least one compound selected from the compounds expressed by the general formulas (II-1) and (II-2):

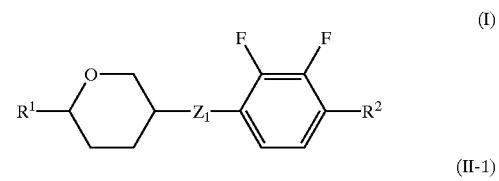

(I)

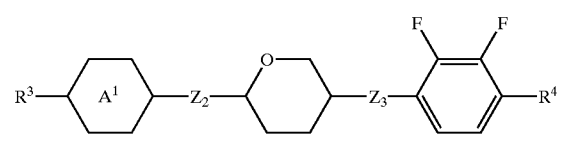

(II-1)

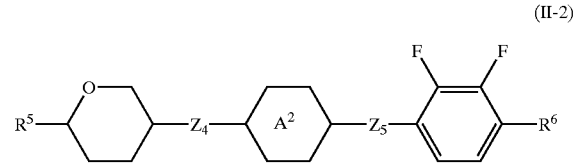

(II-2)

wherein $R^1$ to $R^6$ represent $C_1$ to $C_{10}$ alkyl; $Z_1$ to $Z_5$ represent a single bond or —$CH_2CH_2$—; rings $A^1$ and $A^2$ represent a 1,4-phenylene group or a trans-1,4-cyclohexylene group, and A liquid crystal display element comprising the composition.

11 Claims, No Drawings

LIQUID CRYSTAL COMPOSITION AND LIQUID CRYSTAL DISPLAY ELEMENT

TECHNICAL FIELD

The present invention relates to a nematic liquid crystal composition being particularly suitable for an active matrix type liquid crystal display element and having a negative dielectric anisotropy value, and a liquid crystal display element comprising this liquid crystal composition.

BACKGROUND ART

In liquid crystal display devices (LCD), such advantages as low consumption of electric power, miniaturization and weight reduction can be obtained in contrast to a CRT (Braun tube-type display), and the LCD has practically been used in various modes such as twisted nematic (TN) mode, supertwisted nematic (STN) mode and thin film transistor (TFT) mode. Above all, active matrix LCD (AM-LCD) such as TFT has been noticed as a prospective winner of flat display along with the progress of colorization and high precision.

For this AM-LCD liquid crystal composition, following characteristics are required:
1) A high voltage-holding ratio (VHR) which can maintain high contrast of the LCD,
2) A wide range of nematic liquid crystal phase which can comply with the change of its use environment,
3) Being able to take suitable optical anisotropy ($\Delta n$) in accordance with a cell thickness, and
4) Being able to take suitable threshold voltage in accordance with a driving circuit.

As an operating mode of the AM-LCD, there has been mainly used TN display mode wherein alignment of liquid crystal molecules between upper and lower electrode substrates is twisted by 90°, but since the view angle of the mode is narrow, the mode has a drawback that the application thereof to a large screen display has been difficult.

Accordingly, the following techniques have been proposed for the modes to improve their view angle:
a) IPS display mode wherein liquid crystal display devices exhibit a homogeneous alignment state when voltage is not applied, and a liquid crystal molecule rotates by 45 to 90° in a plane when the voltage its applied (R. Kiefer, B. Weber, F. Windscheid and G. Baur, "In-Plane Switching of Nematic Liquid Crystals", JAPAN DISPLAY '92, p. 547), and
b) VA display mode wherein a liquid crystal display devices exhibit a homeotropic alignment state when voltage is not applied, and changes into an alignment state in one horizontal direction when the voltage is applied (K. Ohmuro, S. Kataoka, T. Sasaki and Y. Koike, "Development of Super-High-Image-Quality Vertical-Alignment-Mode LCD", SID 97 DIGEST, p. 845).

These display modes are characterized by a high-speed response and a high contrast in addition to the realization of the broad view angle, and they also have a large feature that liquid crystal compositions having a negative dielectric anisotropy value ($\Delta\epsilon$) can be applied. These operating modes utilize an electrically controlled birefringence mode.

In this case, in order to obtain the optimum contrast, it is necessary to set a product $\Delta n \cdot d$ of the optical anisotropy value ($\Delta n$) by the cell thickness (d) to a certain value, for example, about 0.275 μm, but since the cell thickness (d) usually ranges from 3 to 6 μm, the $\Delta n$ value is required to be in the range of about 0.05 to 0.10.

Response time is proportional to a value of viscosity (hereinafter, abbreviated to η in some cases) of the liquid crystal composition, and hence, in order to achieve high-speed response, the liquid crystal composition having a small value of η is required. Furthermore, it is preferred that the threshold voltage decreases as the absolute value of the dielectric anisotropy (hereinafter, abbreviated to $\Delta\epsilon$ in some cases) increases. Therefore, the liquid crystal composition having a negative and absolutely large value of $\Delta\epsilon$ is required.

In order to meet such requirements and other requirements in compliance with various objects, liquid crystal compositions have intensively been investigated so far but they are believed to be still out of the expectation.

DISCLOSURE OF THE INVENTION

An object of the present invention is to provide a liquid crystal composition having a suitable value of $\Delta n$ applicable to the above-mentioned display mode a) and b), a low viscosity, a negative and absolutely large value of $\Delta\epsilon$, a broad view angle and a wide nematic liquid crystal phase range, and thus having a high voltage-holding ratio and other various properties required for the above AM-LCD liquid crystal composition.

For achieving the object described above, the present invention is summarized as follows:

(1) A liquid crystal composition comprising, as a first component, at least one compound selected from the compounds expressed by the general formula (I), and, as a second component, at least one compound selected from the compounds expressed by the general formulas (II-1) and (II-2):

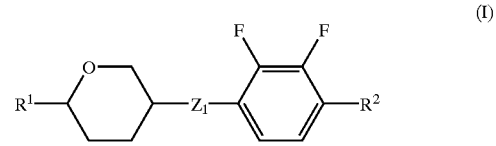

(I)

(II-1)

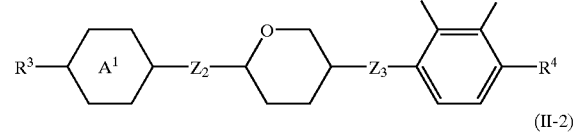

(II-2)

wherein $R^1$, $R^3$ and $R^5$ each independently represent an alkyl group having 1 to 10 carbon atoms or an alkenyl group having 2 to 10 carbon atoms; $R^2$, $R^4$ and $R^6$ each independently represent an alkyl group or an alkoxy group having 1 to 10 carbon atoms, or an alkenyl group having 2 to 10 carbon atoms; $Z_1$ to $Z_5$ each independently represent a single bond or —$CH_2CH_2$—; rings $A^1$ and $A^2$ each independently represent a 1,4-phenylene group or a trans-1,4-cyclohexylene group; and in the case that the ring $A^2$ is the 1,4-phenylene group, at least one hydrogen atom at a lateral position of the ring may be substituted by a fluorine atom.

(2) A liquid crystal composition as recited in paragraph 1 wherein the amounts of the first component and the second component are 3 to 40% by weight and 3 to 70% by weight based on the total weight of the liquid crystal composition, respectively.

(3) A liquid crystal composition as recited in paragraph 1 or 2 wherein the liquid crystal composition further comprises, as a third component, at least one compound selected from the compounds expressed by the general formulas (III-1), (III-2), (III-3), (III-4), (III-5) and (III-6):

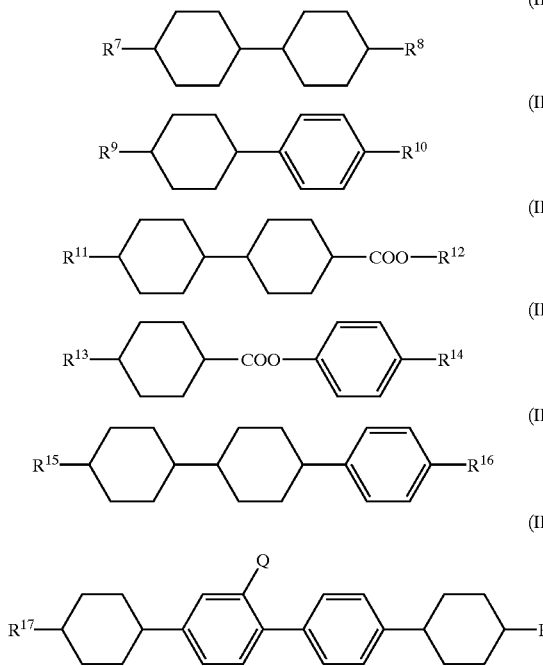

wherein $R^7$, $R^9$, $R^{11}$, $R^{13}$, $R^{15}$ and $R^{17}$ each independently represent an alkyl group having 1 to 10 carbon atoms or an alkenyl group having 2 to 10 carbon atoms; $R^8$, $R^{10}$, $R^{12}$, $R^{14}$ and $R^{16}$ each independently represent an alkyl group or an alkoxy group having 1 to 10 carbon atoms, or an alkenyl group having 2 to 10 carbon atoms; $R^{18}$ represents an alkyl group having 1 to 10 carbon atoms in which one —$CH_2$— may be replaced by —O—, or an alkenyl group having 2 to 10 carbon atoms; and Q represents a hydrogen atom or a fluorine atom.

(4) A liquid crystal composition as recited in the paragraph 3 wherein the amounts of the first component, the second component and the third component are 3 to 40% by weight, 3 to 70% by weight and 1 to 80% by weight based on the total weight of the liquid crystal composition, respectively.

(5) A liquid crystal composition as recited in the paragraph 3 or 4 wherein the liquid crystal composition further comprises, as a fourth component, at least one compound selected from the compounds expressed by the general formulas (IV-1) and (IV-2):

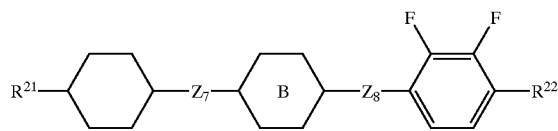

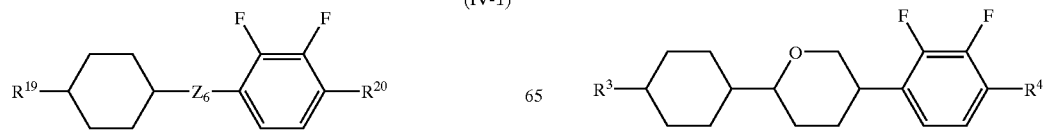

wherein $R^{19}$ and $R^{21}$ each independently represent an alkyl group having 1 to 10 carbon atoms or an alkenyl group having 2 to 10 carbon atoms; $R^{20}$ and $R^{22}$ each independently represent an alkyl group or an alkoxy group having 1 to 10 carbon atoms, or an alkenyl group having 2 to 10 carbon atoms; $Z_6$ to $Z_8$ each independently represent a single bond or —$CH_2CH_2$—; and a ring B represents a 1,4-phenylene group or a trans-1,4-cyclohexylene group.

(6) A liquid crystal display element comprising a liquid crystal composition as recited in any one of the paragraphs 1 to 5.

BEST MODE FOR CARRYING OUT OF THE INVENTION

In a liquid crystal composition of the present invention, compounds which are the first components expressed by the general formula (1) have a value of Δn in a range of about 0.05 to 0.12 and a value of Δε in a range of about −8 to −4, and are excellent in thermal stability, chemical stability and compatibility. Therefore, they play roles in reducing threshold voltage and viscosity of the liquid crystal composition for TFT in which a high reliability is required. However, clearing point (Tc) thereof ranges from about −30 to 20° C., and hence, preparation of the composition having a negative value of Δε from these compounds alone is not preferable, because the Tc of the resultant composition remains too low.

Among the second component, the compounds expressed by the general formulas (II-1) and (II-2) can overcome the drawback as above when used together with the first component.

That is, the second component has a value of Δn in a range of about 0.09 to 0.18, a value of Δε in a range of about −8 to −4, and a value of Tc in a range of 90 to 150° C., and it is excellent in the thermal stability, the chemical stability and compatibility. Therefore, it plays a role in increasing the absolute value of negative Δε and raising the value of Tc of the liquid crystal composition.

Among the second component, the compounds expressed by one of the following formulas (II-1-1) to (II-1-8) can be mentioned as suitable examples of the ones included in the general formula (II-1) and the compounds expressed by one of the following formulas (II-2-1) to (II-2-10) can be mentioned as suitable examples of the ones included in the general formula (II-2), respectively.

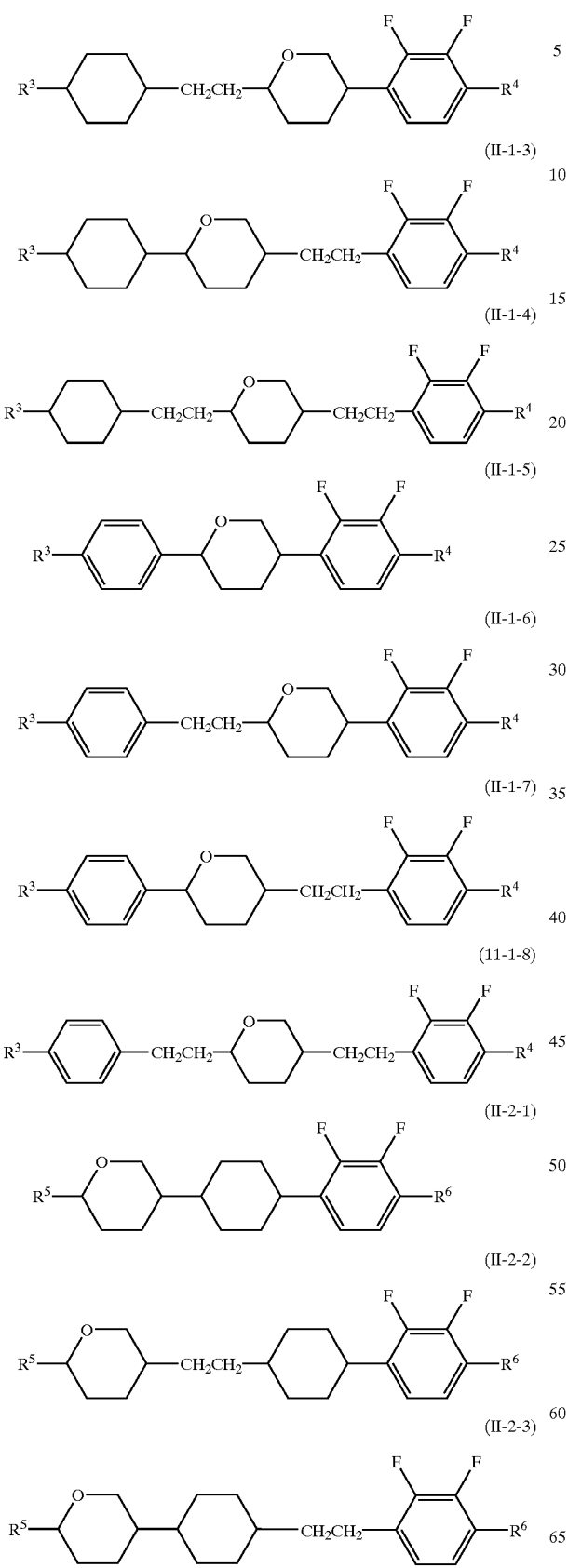
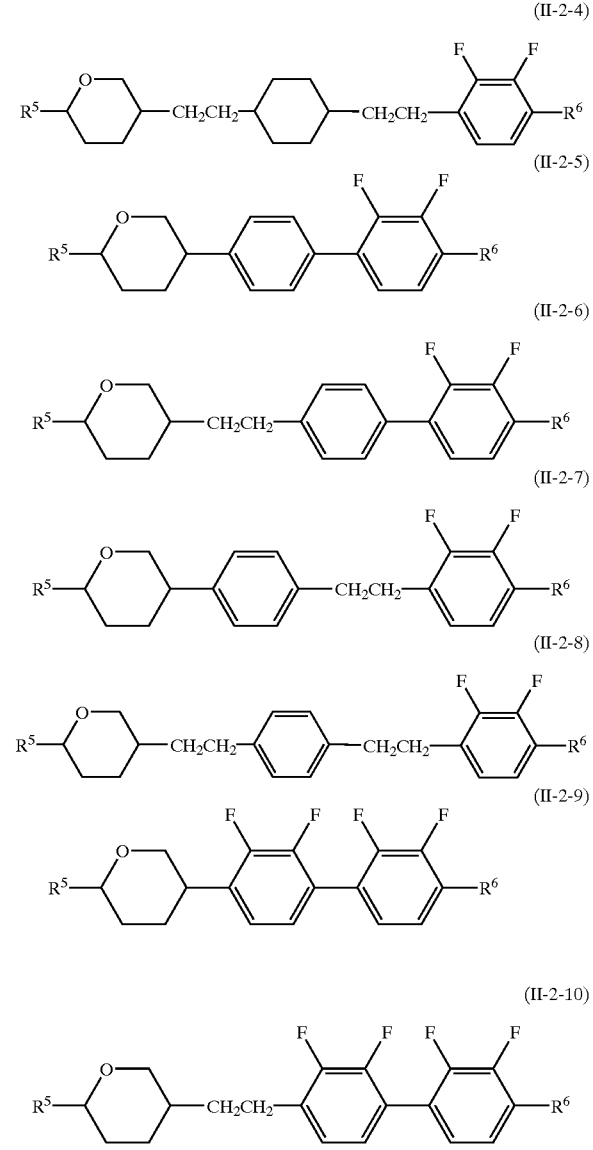

wherein $R^3$, $R^4$, $R^5$ and $R^6$ have the same meanings as defined above.

The liquid crystal composition for AM-LCD having the ability to achieve the above-mentioned object of the present invention can be prepared optionally by combining at least one of the compounds of the first component and at least one of the compounds of the second component.

Among the third component, the compounds expressed by any one of the formulas (III-1), (III-2), (III-3) and (III-4) have a value of Tc in a range of about 10 to 80° C., a value of Δε in about zero and a value of Δn in a range of about 0.01 to 0.08, and therefore, they play a role mainly in reducing the Δn of the composition. Among them, the compounds expressed by the formulas (III-1) and (III-2) play also a role in reducing the viscosity of the composition.

Furthermore, the compounds expressed by the formulas (III-5) and (III-6) have a value of Δn in a range of about 0.10 to 0.20, a value of Δε in about zero, and a value of Tc in a range of about 130 to 260° C., and therefore, they play in particular a role in raising the Tc of the composition.

As mentioned above, Δn, viscosity and nematic liquid crystal phase range of the composition can be adjusted by adding the third component to the composition comprising the first component and the second component in accordance with the object of the present invention. There can be prepared the liquid crystal composition which is particularly suitable as the liquid crystal composition for AM-LCD, by having a value of Tc in a range of about 60 to 100° C., a value of Δn in a range of 0.06 to 0.12 and a value of Δε in a range of −6 to −1, and by having low viscosity and wide nematic liquid crystal phase range.

Next, among the fourth component, the compounds expressed by the general formula (IV-1) have a value of Tc in a range of about −20 to 30° C., a value of Δn in a range of 0.06 to 0.12 and a value of Δε in a range of −7 to −3, and they are also excellent in the thermal stability and the chemical stability. The compounds expressed by the general formula (IV-2) have Tc in a range of about 120 to 180° C., Δn in a range of 0.08 to 0.21, and Δε in a range of −7 to −4, and they are also excellent in the thermal stability and the chemical stability.

These compounds expressed by the formulas (IV-1) and (IV-2) play a role in reducing the threshold voltage and the viscosity of the liquid crystal composition for TFT in which a high reliability is required, and they are also effective for a fine adjustment of the Δε.

While the fourth component can be added to the composition comprising at least one compounds of the first component and at least one compounds of the second component, or to the composition comprising further the third component therein, thereby can be adjusted Δn, viscosity, Δε (negative and absolutely large value) and nematic liquid crystal phase range of the resultant composition in accordance with the purpose of the present invention.

The following will explain the amounts of the respective components to be used. First, the amount of the first component is preferably in a range of 3 to 40% by weight, more preferably 5 to 35% by weight based on the total weight of the liquid crystal composition.

Namely, when the amount of the first component to be used is less than 3% by weight, whereas the resulting liquid crystal composition exhibits negative Δε, its absolute value inconveniently retains too small and the threshold voltage goes high in some cases. On the other hand, when the amount is more than 40% by weight, the resultant composition goes to have a disadvantage that the compatibility thereof is poor at a low temperature and its Tc is low on occasion.

Next, the amount of the second component is preferably in a range of 3 to 70% by weight, more preferably 5 to 65% by weight based on the total weight of the liquid crystal composition. When the amount is less than 3% by weight, whereas the resulting liquid crystal composition exhibits a negative Δε, its absolute value retains inconveniently too small in some cases. On the other hand, when the amount is more than 70% by weight, the resulting composition goes to have a disadvantage that the compatibility thereof is poor at a low temperature in some cases.

The amount of the third component to be used is preferably 80% by weight or less based on the total weight of the liquid crystal composition. That is, if the amount of the third component to be used is more than 80% by weight, the resulting liquid crystal composition goes to have a disadvantage that the absolute value of the Δε (negative) retains too small and the threshold voltage goes high in some cases.

The above compounds for the respective components can easily be obtained by applying such a known method of organic synthesis as following.

In this regard, both of the compounds expressed by the general formula (I) of the first component and the compounds expressed by the formula (II-1) or (II-2) of the second component are those which have a pyran ring, and these kind of compounds having such a structure can be synthesized from compounds obtained by reacting aldehyde derivatives and bromoacetic acid esters by applying Reformatsky reaction (M. W. RATHKE et al., J.O.C., 35(11), 3966 (1970); J. F. RUPPERT et al., J.O.C., 39(2), 269 (1974)), a method of P. PICARD et al. (Synthesis, 550 (1981)) and a method of M. Yamaguchi et al. (Tetrahedron Lett., 25(11), 1159 (1984)), and followed by hydrosilylation of the said compounds (G. A. Kraus et al., J. Org. Chem., 46, 2417, (1981); and G. A. Kraus et al., J. Chem. Soc., Chem. Commun., 1568, (1986)).

Among the third components of the present invention, the compounds expressed by the general formula (III-1) can be synthesized by methods described in, for example, Japanese Patent Application Laid-Open Nos. 70624/1984 and 16940/1985; the compounds expressed by the general formula (III-4) can be synthesized by a method described in, for example, Japanese Patent Application Laid-Open No. 27546/1979; and the compounds expressed by the general formula (III-5) can be synthesized by a method described in, for example, Japanese Patent Application Laid-Open No. 165328/1982. In addition, the compounds expressed by the general formula (IV-1) or (IV-2) of the fourth component of the present invention can be synthesized in accordance with a method described in, for example, Japanese Patent Application Laid-Open No. 228037,/1994.

The liquid crystal compositions of the present invention can be produced by methods, which are conventional. For instance, compositions are produced by a method in which various components are dissolved in one another at a high temperature.

Further, should it be necessary, the compositions may be improved and optimized by adding thereto suitable additives in accordance with any application intended.

Such additives are well known by a person skilled in the art and are described in detail in literatures or the like.

In addition, the compositions can be used as ones for guest-host (GH) mode by adding a dichroic dye such as mellocyanine type, a styryl type, azo type, azomethine type, an azoxy type, quinophthalone type, anthraquinone type, or tetrazine type thereto.

The liquid crystal compositions of the present invention can also be used as ones for NCAP which is prepared by microcapsulation of a nematic liquid crystal, or as ones for polymer dispersed liquid crystal display devices (PDLCD) represented by polymer network liquid crystal display devices (PNLCD) prepared by forming a polymer of three-dimensional reticulated structure in a liquid crystal.

Still further, the liquid crystal compositions of the present invention can be used as ones for the liquid crystal compositions to which at least one chiral compound is added, as ones for electrically controlled birefringence (ECB) mode or a dynamic scattering (DS) mode.

The present invention will be explained below in more detail with reference to Examples. However, it should be understood that the scope of the present invention is by no means restricted by such specific Examples.

In each of the Comparative Examples and Examples, compounds as components are shown by symbols referring to the definitions given in Table 1, and % means the content of compounds by weight unless otherwise indicated.

Furthermore, data of characteristics of liquid crystal compositions are indicated by Tc (clearing point), $T_L$ (lower temperature limit of nematic liquid crystal phase), Δn (optical anisotropy value: determined at 25° C.), Δε

(dielectric anisotropy value: determined at 25° C.), $\eta_{20}$ (viscosity: determined at 20° C.), VHR (25° C.) (voltage-holding ratio at 25° C.), and VHR (80° C.) (voltage-holding ratio at 80° C.)

In this regard, the said $T_L$ was estimated by observing the liquid crystal phase of each of the compositions after allowed to stand in freezers at 0° C., −10° C., −20° C., −30° C. and −40° C. for 30 days, respectively. The value of $\Delta\epsilon$ ($=\Delta\|-\epsilon\perp$) was determined by measuring the $\epsilon\perp$ (dielectric constant in the direction of symmetry axis) and the $\epsilon\perp$ (dielectric constant in the direction perpendicular to symmetry axis) of each of a cell in which liquid crystals were subjected to a homeotropic alignment and a cell in which liquid crystals were subjected to a homogeneous alignment. In addition, the measurement of VHR (25° C.) and VHR (80° C.) was carried out with an actually made TN cell (as an aligned film, PIA-5210 manufactured by Chisso Corporation was used), and by using an area method in which holding time is kept for 16.6 msec.

TABLE 1

Notation of Compounds by Using Symbols

R—(A₁)—Z₁———···———Zₙ—(Aₙ)—X

| | Symbol |
|---|---|
| 1) Left terminal group R— | |
| $C_nH_{2n+1}$— | n— |
| $C_nH_{2n+1}OC_mH_{2m}$— | nOm— |
| $CH_2$=$CHC_nH_{2n}$— | Vn— |
| 2) Ring structure —(A₁)—, —(Aₙ)— | |
|  | H |
|  | B |
| 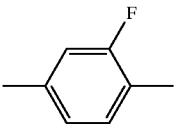 | B (F) |
| 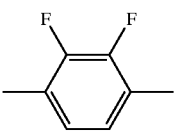 | B (2F,3F) |
| 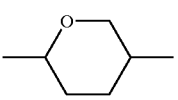 | Dh |
| 3) Bonding group —Z₁—, —Zₙ— | |
| —$CH_2$— | 1 |
| —$C_2H_4$— | 2 |
| —COO— | E |
| 4) Right terminal group —X | |
| —$C_nH_{2n+1}$ | —n |
| —$OC_nH_{2n+1}$ | —On |

TABLE 1-continued

Notation of Compounds by Using Symbols

R—(A₁)—Z₁———···———Zₙ—(Aₙ)—X

| | Symbol |
|---|---|
| —$COOCH_3$ | —EMe |
| —$C_nH_{2n}OC_mH_{2m+1}$ | —nOm |
| 5) Notation example | |

Example 1; 3 - DhB (2F, 3F) - 02

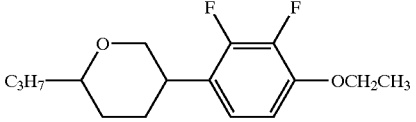

Example 2; V2 - HDhB (2F, 3F) - 02

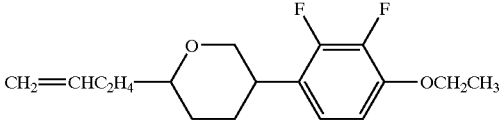

Example 3; 3 - HEB - 04

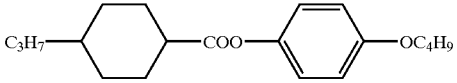

COMPARATIVE EXAMPLE 1

Composition A

In Example 26 of Japanese Patent Application Laid-Open No. 228037/1994, there is disclosed the following composition in which a compound having negative $\Delta\epsilon$ is used.

| | |
|---|---|
| 3-HBB(2F,3F)-1O1 | 10.0% |
| ZLI-1132 (commercially available liquid crystals made by Merck Co.) | 90.0% |

Characteristics of this composition were determined to be as follows:

$T_C$=74.9(° C.)
$T_L$<−20° C.
$\Delta n$=0.139
$\Delta\epsilon$=9.7
$\eta_{20}$=29.2(mPa·s)
VHR (25° C.)=95.8
VHR (80° C.)=48.5

As apparent from the above results, it is found that this composition has a positive value of $\Delta\epsilon$ and remarkably low voltage-holding ratio (VHR).

COMPARATIVE EXAMPLE 2

Composition C

In Example 27 of Japanese Patent Application Laid-Open No. 228037/1994, there is disclosed the following composition in which a compound having negative $\Delta\epsilon$ is used.

| | |
|---|---|
| 5-HHB(2F,3F)-1O1 | 90.0% |
| ZLI-1132 | 10.0% |

Characteristics of this composition were determined to be as follows:

$T_C$=77.0 (° C.)
$T_L$<-20° C.
$\Delta n$=0.133
$\Delta \epsilon$=9.7
$\eta_{20}$=29.1(mPa·s)
VHR(25° C.)=96.1
VHR (80° C.)=48.7

As apparent from the above results, it is found that this liquid crystal composition has a positive value of $\Delta \epsilon$ and remarkably low voltage-holding ratio (VHR).

Since the compositions disclosed in Comparative Examples 1 and 2 contain a large amount of compounds having a cyano group, the value of voltage-holding ratio (VHR) is small, so that these compositions are not applied to AM-LCD. In addition, the value of $\Delta \epsilon$ is also positive, which is not a desired negative value.

EXAMPLE 1

Liquid crystal composition comprising the following components in the amount below was prepared:

| | |
|---|---|
| The first component | |
| 5-DhB(2F,3F)-O1 | 7.0% |
| 3-DhB(2F,3F)-O2 | 8.0% |
| 5-DhB(2F,3F)-O2 | 8.0% |
| The second component | |
| 3-HDhB(2F,3F)-O1 | 12.0% |
| 3-HDhB(2F,3F)-O2 | 13.0% |
| 5-HDhB(2F,3F)-O1 | 13.0% |
| 5-HDhB(2F,3F)-O2 | 13.0% |
| 5-BDhB(2F,3F)-O2 | 3.0% |
| The third component | |
| 3-HH-4 | 6.0% |
| 3-HB-2 | 6.0% |
| 3-HHB-1 | 4.0% |
| 3-HHB-3 | 3.0% |
| 3-HHB-O1 | 4.0% |

Characteristics of this composition were measured to be as follows:

$T_C$=86.3 (° C.)
$T_L$<-20° C.
$\Delta n$=0.095
$\Delta \epsilon$=-5.0
$\eta_{20}$=39.9 (mPa·s)
VHR (25° C.)=98.7
VHR(80° C.)=98.0

It is found that this composition has particularly a negative and absolutely large value of $\Delta \epsilon$ and a very high voltage-holding ratio (VHR), as compared with those of Comparative Examples 1 and 2. Accordingly, the composition is suitable for display systems of the above-described modes a) and b).

EXAMPLE 2

Liquid crystal composition comprising the following components in the amount below was prepared:

| | |
|---|---|
| The first component | |
| 3-DhB(2F,3F)-O2 | 5.0% |
| 5-DhB(2F,3F)-O2 | 5.0% |
| The second component | |
| 3-HDhB(2F,3F)-O1 | 9.0% |
| 5-HDhB(2F,3F)-O1 | 10.0% |
| 3-HDhB(2F,3F)-O2 | 9.0% |
| 5-HDhB(2F,3F)-O2 | 10.0% |
| The third component | |
| 2-HH-3 | 4.0% |
| 3-HH-4 | 10.0% |
| 3-HB-2 | 16.0% |
| 3-HB-4 | 4.0% |
| 3-HHB-1 | 5.0% |
| 3-HHB-3 | 9.0% |
| 3-HHB-O1 | 4.0% |

Characteristics of this composition were measured to be as follows:

$T_C$=85.9 (° C.)
$T_L$<-20° C.
$\Delta n$=0.085
$\Delta \epsilon$=-3.1
$\eta_{20}$=24.0 (mPa·s)
VHR(25° C.)=98.9
VHR(80° C.)=98.3

It is found that this composition has a negative and absolutely large value of $\Delta \epsilon$, a low viscosity, and an extremely high value of voltage-holding ratio.

EXAMPLE 3

Liquid crystal composition comprising the following components in the amount below was prepared:

| | |
|---|---|
| The first component | |
| 3-DhB(2F,3F)-O2 | 6.0% |
| 5-DhB(2F,3F)-O2 | 6.0% |
| The second component | |
| 3-HDhB(2F,3F)-O1 | 7.0% |
| 3-HDhB(2F,3F)-O2 | 7.0% |
| The third component | |
| 3-HEB-O4 | 17.0% |
| 4-HEB-O2 | 13.0% |
| 5-HEB-O1 | 13.0% |
| 3-HEB-O2 | 11.0% |
| 5-HEB-O2 | 8.0% |
| 1O1-HBBH-4 | 6.0% |
| 1O1-HBBH-5 | 6.0% |

Characteristics of this composition were measured to be as follows:

$T_C$=91.2 (° C.)
$T_L$<-20° C.
$\Delta n$=0.100
$\Delta \epsilon$=-1.4
$\eta_{20}$=31.9 (mPa·s)
VHR (25° C.)=99.0
VHR (80° C.)=98.4

It is found that this composition has a negative value of $\Delta \epsilon$ and an extremely high value of voltage-holding ratio.

EXAMPLE 4

Liquid crystal composition comprising the following components in the amount below was prepared:

| The first component | |
|---|---|
| 3-DhB(2F,3F)-1 | 5.0% |
| 5-DhB(2F,3F)-1 | 5.0% |
| 3-DhB(2F,3F)-O1 | 7.0% |
| 5-DhB(2F,3F)-O1 | 7.0% |
| 3-DhB(2F,3F)-O2 | 7.0% |
| 5-DhB(2F,3F)-O2 | 7.0% |
| The second component | |
| 3-HDhB(2F,3F)-O2 | 5.0% |
| The third component | |
| 3-HEB-O4 | 12.0% |
| 4-HEB-O2 | 9.0% |
| 5-HEB-O1 | 9.0% |
| 3-HEB-O2 | 7.0% |
| 5-HEB-O2 | 6.0% |
| 1O1-HBBH-4 | 5.0% |
| 1O1-HBBH-5 | 6.0% |
| 3-HB(F)BH-4 | 3.0% |

Characteristics of this composition were measured to be as follows:

$T_C$=70.0 (° C.)
$T_L$<−20° C.
$\Delta n$=0.094
$\Delta \epsilon$=1.9
$\eta_{20}$=33.3 (mPa·s)
VHR (25° C)=99.0
VHR (80° C.)=98.2

EXAMPLE 5

Liquid crystal composition comprising the following components in the amount below was prepared:

| The first component | |
|---|---|
| 5-DhB(2F,3F)-O1 | 5.0% |
| The second component | |
| 3-HDhB(2F,3F)-1 | 4.0% |
| 3-HDhB(2F,3F)-3 | 4.0% |
| 3-HDhB(2F,3F)-O1 | 12.0% |
| 5-HDhB(2F,3F)-O1 | 12.0% |
| 3-HDhB(2F,3F)-O2 | 12.0% |
| 5-HDhB(2F,3F)-O2 | 12.0% |
| 3-BDhB(2F,3F)-O3 | 5.0% |
| The third component | |
| 3-HEB-O4 | 9.0% |
| 4-HEB-O2 | 7.0% |
| 5-HEB-O1 | 7.0% |
| 3-HEB-O2 | 6.0% |
| 5-HEB-O2 | 5.0% |

Characteristics of this composition were measured to be as follows:

$T_C$=92.7 (° C.)
$T_L$<−20 ° C.
$\Delta n$=0.097
$\Delta \epsilon$=−3.9
$\eta_{20}$=44.6 (mPa·s)

EXAMPLE 6

Liquid crystal composition comprising the following components in the amount below was prepared:

| The first component | |
|---|---|
| 5-DhB(2F,3F)-O1 | 7.0% |
| 3-DhB(2F,3F)-O2 | 8.0% |
| 5-DhB(2F,3F)-O2 | 8.0% |
| The second component | |
| 3-HDhB(2F,3F)-O1 | 10.0% |
| 3-HDhB(2F,3F)-O1 | 10.0% |
| 3-HDhB(2F,3F)-O2 | 10.0% |
| 3-HDhB(2F,3F)-O2 | 10.0% |
| The third component | |
| 3-HEB-O4 | 8.0% |
| 4-HEB-O2 | 6.0% |
| 5-HEB-O1 | 6.0% |
| 3-HEB-O2 | 5.0% |
| 5-HEB-O2 | 5.0% |
| 1O1-HBBH-4 | 3.0% |
| 1O1-HBBH-5 | 4.0% |

Characteristics of this composition were measured to be as follows:

$T_C$=86.9 (° C.)
$T_L$<−20° C.
$\Delta n$=0.099
$\Delta \epsilon$=−3.8
$\eta_{20}$=43.1 (mPa·s)

EXAMPLE 7

Liquid crystal composition comprising the following components in the amount below was prepared:

| The first component | |
|---|---|
| 3-DhB(2F,3F)-O1 | 7.0% |
| 5-DhB(2F,3F)-O1 | 7.0% |
| 3-DhB(2F,3F)-O2 | 7.0% |
| 5-DhB(2F,3F)-O2 | 7.0% |
| 3-Dh2B(2F,3F)-O2 | 4.0% |
| The second component | |
| 3-HDhB(2F,3F)-1 | 5.0% |
| 3-HDhB(2F,3F)-3 | 5.0% |
| 3-HDhB(2F,3F)-O1 | 11.0% |
| 5-HDhB(2F,3F)-O1 | 11.0% |
| 3-HDhB(2F,3F)-O2 | 11.0% |
| 5-HDhB(2F,3F)-O2 | 11.0% |
| 3-BDhB(2F,3F)-O3 | 4.0% |
| 3-DhHB(2F,3F)-O2 | 4.0% |
| The third component | |
| 3-HBBH-5 | 3.0% |
| 3-HB(F)BH-5 | 3.0% |

Characteristics of this composition were measured to be as follows:

$T_C$=82.6 (° C.)
$T_L$<−20° C.
$\Delta n$=0.099
$\Delta \epsilon$=−6.0
$\eta_{20}$=52.5 (mPa·s)

EXAMPLE 8

Liquid crystal composition comprising the following components in the amount below was prepared:

| The first component | |
|---|---|
| 3-DhB(2F,3F)-O2 | 6.0% |
| 5-DhB(2F,3F)-O2 | 6.0% |
| The second component | |
| 3-HDhB(2F,3F)-O1 | 7.0% |
| 3-HDhB(2F,3F)-O2 | 7.0% |
| The third component | |
| 2-HH-3 | 5.0% |
| 3-HH-4 | 8.0% |
| 3-HB-O2 | 12.0% |
| 3-HH-EMe | 10.0% |
| 3-HHB-1 | 5.0% |
| 3-HHB-3 | 6.0% |
| 3-HHB-O1 | 5.0% |
| 3-HEB-O4 | 6.0% |
| 4-HEB-O2 | 5.0% |
| 5-HEB-O1 | 5.0% |
| 3-HEB-O2 | 4.0% |
| 5-HEB-O2 | 3.0% |

Characteristics of this composition were measured to be as follows:
$T_C$=75.4 (° C.)
$T_L$<−20 ° C.
Δn=0.079
Δε=−1.0
$\eta_{20}$=19.4 (mPa·s)

EXAMPLE 9

Liquid crystal composition comprising the following components in the amount below was prepared:

| The first component | |
|---|---|
| 3-DhB(2F,3F)-1 | 5.0% |
| 5-DhB(2F,3F)-1 | 5.0% |
| 3-DhB(2F,3F)-O1 | 5.0% |
| 5-DhB(2F,3F)-O1 | 5.0% |
| 3-DhB(2F,3F)-O2 | 8.0% |
| 5-DhB(2F,3F)-O2 | 8.0% |
| The second component | |
| 5-HDhB(2F,3F)-O2 | 5.0% |
| The third component | |
| 3-HH-4 | 5.0% |
| 3-HB-O2 | 7.0% |
| 2-HH-EMe | 4.0% |
| 3-HH-EMe | 8.0% |
| 2-HHB-1 | 5.0% |
| 3-HHB-1 | 7.0% |
| 3-HHB-3 | 7.0% |
| 3-HHB-O1 | 5.0% |
| 4-HEB-O2 | 5.0% |
| 5-HEB-O2 | 6.0% |

Characteristics of this composition were measured to be as follows:
$T_C$=60.1 (° C.)
$T_L$<−20° C.
Δn=0.076
Δε=−1.4
$\eta_{20}$=23.2 (mPa·s)

EXAMPLE 10

Liquid crystal composition comprising the following components in the amount below was prepared:

| The first component | |
|---|---|
| 5-DhB(2F,3F)-O1 | 5.0% |
| The second component | |
| 3-HDhB(2F,3F)-1 | 5.0% |
| 3-HDhB(2F,3F)-3 | 5.0% |
| 3-HDhB(2F,3F)-O1 | 10.0% |
| 5-HDhB(2F,3F)-O1 | 11.0% |
| 3-HDhB(2F,3F)-O2 | 11.0% |
| 5-HDhB(2F,3F)-O2 | 11.0% |
| 5-BDhB(2F,3F)-O1 | 5.0% |
| 5-BDhB(2F,3F)-O2 | 3.0% |
| 3-DhB(2F,3F)B(2F,3F)-O2 | 3.0% |
| The third component | |
| 3-HH-4 | 5.0% |
| 3-HB-O2 | 4.0% |
| 3-HH-EMe | 4.0% |
| 3-HHB-1 | 3.0% |
| 3-HHB-O1 | 4.0% |
| 4-HEB-O2 | 5.0% |
| 5-HEB-O2 | 6.0% |

Characteristics of this composition were measured to be as follows:
$T_C$=94.7 (° C.)
$T_L$<−20° C.
Δn=0.094
Δε=−3.8
$\eta_{20}$=43.8 (mPa·s)

EXAMPLE 11

Liquid crystal composition comprising the following components in the amount below was prepared:

| The first component | |
|---|---|
| 3-DhB(2F,3F)-O1 | 5.0% |
| 5-DhB(2F,3F)-O1 | 5.0% |
| 3-DhB(2F,3F)-O2 | 5.0% |
| 5-DhB(2F,3F)-O2 | 5.0% |
| The second component | |
| 3-HDhB(2F,3F)-3 | 3.0% |
| 5-HDhB(2F,3F)-1 | 3.0% |
| 3-HDhB(2F,3F)-O1 | 10.0% |
| 5-HDhB(2F,3F)-O1 | 10.0% |
| 3-HDhB(2F,3F)-O2 | 10.0% |
| 5-HDhB(2F,3F)-O2 | 10.0% |
| The third component | |
| 3-HH-4 | 8.0% |
| 3-HB-O4 | 6.0% |
| 3-HH-EMe | 6.0% |
| 3-HHB-3 | 4.0% |
| 3-HEB-O4 | 4.0% |
| 3-HBBH-3 | 3.0% |
| 1O1-HBBH-5 | 3.0% |

Characteristics of this composition were measured to be as follows:
$T_C$=84.4 (° C.)
$T_L$<−20° C.
Δn=0.089
Δε=−3.9
$\eta_{20}$=40.2 (mPa·s)

EXAMPLE 12

Liquid crystal composition comprising the following components in the amount below was prepared:

| The first component | |
|---|---|
| 3-Dh2B(2F,3F)-O2 | 3.0% |
| 3-DhB(2F,3F)-O2 | 3.0% |
| 5-DhB(2F,3F)-O2 | 6.0% |
| The second component | |
| 3-HDhB(2F,3F)-O1 | 7.0% |
| 3-HDhB(2F,3F)-O2 | 7.0% |
| The third component | |
| 3-HH-4 | 12.0% |
| 3-HB-O2 | 16.0% |
| 3-HB-O4 | 8.0% |
| 2-HH-EMe | 6.0% |
| 3-HH-EMe | 10.0% |
| 3-HHB-1 | 7.0% |
| 3-HHB-3 | 10.0% |
| 3-HHB-O1 | 5.0% |

Characteristics of this composition were measured to be as follows:

$T_C=72.0$ (° C.)
$T_L<-20°$ C.
$\Delta n=0.076$
$\Delta\epsilon=-1.2$
$\eta_{20}=16.2$ (mPa·s)

EXAMPLE 13

Liquid crystal composition comprising the following components in the amount below was prepared:

| The first component | |
|---|---|
| 3-DhB(2F,3F)-1 | 5.0% |
| 5-DhB(2F,3F)-1 | 5.0% |
| 3-DhB(2F,3F)-O1 | 5.0% |
| 5-DhB(2F,3F)-O1 | 5.0% |
| 3-DhB(2F,3F)-O2 | 8.0% |
| 5-DhB(2F,3F)-O2 | 8.0% |
| The second component | |
| 5-HDhB(2F,3F)-O2 | 5.0% |
| The third component | |
| 3-HH-4 | 10.0% |
| 3-HB-O2 | 8.0% |
| 2-HH-EMe | 4.0% |
| 3-HH-EMe | 8.0% |
| 2-HHB-1 | 5.0% |
| 3-HHB-1 | 7.0% |
| 3-HHB-3 | 12.0% |
| 3-HHB-O1 | 5.0% |

Characteristics of this composition were measured to be as follows:

$T_C=62.3$ (° C.)
$T_L<-20°$ C.
$\Delta n=0.076$
$\Delta\epsilon=-2.0$
$\eta_{20}=21.0$ (mPa·s)

EXAMPLE 14

Liquid crystal composition comprising the following components in the amount below was prepared:

| The first component | |
|---|---|
| 5-DhB(2F,3F)-O1 | 5.0% |
| The second component | |
| 3-HDhB(2F,3F)-1 | 4.0% |
| 3-HDhB(2F,3F)-3 | 4.0% |
| 3-HDhB(2F,3F)-O1 | 10.0% |
| 5-HDhB(2F,3F)-O1 | 10.0% |
| 3-HDhB(2F,3F)-O2 | 11.0% |
| 5-HDhB(2F,3F)-O2 | 11.0% |
| 3-H2DhB(2F,3F)-O2 | 3.0% |
| 5-BDhB(2F,3F)-O1 | 4.0% |
| 3-DhHB(2F,3F)-O2 | 3.0% |
| 3-DhBB(2F,3F)-O2 | 4.0% |
| The third component | |
| 3-HH-4 | 10.0% |
| 3-HB-O2 | 8.0% |
| 3-HH-EMe | 4.0% |
| 3-HHB-1 | 4.0% |
| 3-HHB-O1 | 5.0% |

Characteristics of this composition were measured to be as follows:

$T_C=96.3$ (° C.)
$T_L<-20°$ C.
$\Delta n=0.095$
$\Delta\epsilon=-3.9$
$\eta_{20}=40.7$ (mPa·s)

EXAMPLE 15

Liquid crystal composition comprising the following components in the amount below was prepared:

| The first component | |
|---|---|
| 3-DhB(2F,3F)-O1 | 5.0% |
| 5-DhB(2F,3F)-O1 | 5.0% |
| 3-DhB(2F,3F)-O2 | 5.0% |
| 5-DhB(2F,3F)-O2 | 5.0% |
| The second component | |
| 5-HDhB(2F,3F)-1 | 3.0% |
| 3-HDhB(2F,3F)-O1 | 10.0% |
| 5-HDhB(2F,3F)-O1 | 10.0% |
| 3-HDhB(2F,3F)-O2 | 10.0% |
| 5-HDhB(2F,3F)-O2 | 10.0% |
| 3-DhHB(2F,3F)-O2 | 3.0% |
| The third component | |
| 3-HH-4 | 8.0% |
| 3-HB-O2 | 6.0% |
| 3-HB-O4 | 6.0% |
| 3-HH-EMe | 6.0% |
| 3-HHB-3 | 8.0% |

Characteristics of this composition were measured to be as follows:

$T_C=73.8$ (° C.)
$T_L<-20°$ C.
$\Delta n=0.084$
$\Delta\epsilon=-4.3$
$\eta_{20}=35.4$ (mPa·s)

EXAMPLE 16

Liquid crystal composition comprising the following components in the amount below was prepared:

| The first component | |
|---|---|
| 3-DhB(2F,3F)-O1 | 4.0% |
| 5-DhB(2F,3F)-O1 | 4.0% |
| 3-DhB(2F,3F)-O2 | 4.0% |
| 5-DhB(2F,3F)-O2 | 4.0% |
| V2-DhB(2F,3F)-O3 | 4.0% |
| The second component | |
| 5-HDhB(2F,3F)-1 | 3.0% |
| 3-HDhB(2F,3F)-O1 | 8.0% |
| 5-HDhB(2F,3F)-O1 | 8.0% |
| 3-HDhB(2F,3F)-O2 | 8.0% |
| 5-HDhB(2F,3F)-O2 | 9.0% |
| V2-HDhB(2F,3F)-O2 | 4.0% |
| 3-H2DhB(2F,3F)-1 | 3.0% |
| 3-DhBB(2F,3F)-O2 | 3.0% |
| The third component | |
| 3-HH-4 | 4.0% |
| V2-HH-4 | 4.0% |
| 3-HB-O2 | 6.0% |
| 3-HB-O4 | 6.0% |
| 3-HH-EMe | 6.0% |
| 3-HHB-3 | 4.0% |
| V2-HHB-3 | 4.0% |

Characteristics of this composition were measured to be as follows:

$T_C$=73.6 (° C.)
$T_L$<−20° C.
$\Delta n$=0.086
$\Delta \epsilon$=−4.2
$\eta_{20}$=34.7 (mPa·s)

EXAMPLE 17

Liquid crystal composition comprising the following components in the amount below was prepared:

| The first component | |
|---|---|
| 3-DhB(2F,3F)-O1 | 8.0% |
| 5-DhB(2F,3F)-O1 | 8.0% |
| 3-DhB(2F,3F)-O2 | 8.0% |
| 5-DhB(2F,3F)-O2 | 8.0% |
| The second component | |
| 3-HDhB(2F,3F)-1 | 5.0% |
| 3-HDhB(2F,3F)-3 | 5.0% |
| 3-HDhB(2F,3F)-O1 | 12.0% |
| 5-HDhB(2F,3F)-O1 | 12.0% |
| 3-HDhB(2F,3F)-O2 | 12.0% |
| 5-HDhB(2F,3F)-O2 | 12.0% |
| 3-DhHB(2F,3F)-O3 | 4.0% |
| The third component | |
| 3-HB-O2 | 3.0% |
| 3-HH-EMe | 3.0% |

Characteristics of this composition were measured to be as follows:

$T_C$=70.0 (° C.)
$T_L$<−20° C.
$\Delta n$=0.092
$\Delta \epsilon$=−6.2
$\eta_{20}$=48.4 (mPa·s)

EXAMPLE 18

Liquid crystal composition comprising the following components in the amount below was prepared:

| The first component | |
|---|---|
| 3-DhB(2F,3F)-O2 | 6.0% |
| 5-DhB(2F,3F)-O2 | 6.0% |
| The second component | |
| 5-HDhB(2F,3F)-O1 | 7.0% |
| 3-HDhB(2F,3F)-O2 | 7.0% |
| 5-HDhB(2F,3F)-O2 | 8.0% |
| The third component | |
| 2-HH-3 | 5.0% |
| 3-HH-4 | 5.0% |
| 3-HB-O2 | 10.0% |
| 3-HB-O4 | 4.0% |
| 3-HH-EMe | 6.0% |
| 3-HHB-3 | 7.0% |
| The fourth component | |
| 3-HB(2F,3F)-O2 | 5.0% |
| 5-HB(2F,3F)-O2 | 5.0% |
| 3-HHB(2F,3F)-O2 | 7.0% |
| 5-HHB(2F,3F)-O2 | 7.0% |
| 3-HBB(2F,3F)-O2 | 5.0% |

Characteristics of this composition were measured to be as follows:

$T_C$=79.9 (° C.)
$T_L$<−20° C.
$\Delta n$=0.087
$\Delta \epsilon$=−3.8
$\eta_{20}$=28.2 (mPa·s)

EXAMPLE 19

Liquid crystal composition comprising the following components in the amount below was prepared:

| The first component | |
|---|---|
| 3-DhB(2F,3F)-O2 | 6.0% |
| 5-DhB(2F,3F)-O2 | 6.0% |
| The second component | |
| 5-HDhB(2F,3F)-O1 | 7.0% |
| 3-HDhB(2F,3F)-O2 | 7.0% |
| 5-HDhB(2F,3F)-O2 | 8.0% |
| The third component | |
| 2-HH-3 | 5.0% |
| 3-HH-4 | 5.0% |
| 3-HB-O2 | 10.0% |
| 3-HB-O4 | 4.0% |
| 3-HH-EMe | 6.0% |
| 3-HHB-3 | 7.0% |
| The fourth component | |
| V2-HB(2F,3F)-O2 | 5.0% |
| 5-HB(2F,3F)-O2 | 5.0% |
| 3-HHB(2F,3F)-O2 | 4.0% |
| V2-HHB(2F,3F)-O2 | 3.0% |
| 5-HHB(2F,3F)-O2 | 6.0% |
| 3-HBB(2F,3F)-O2 | 3.0% |
| V2-HBB(2F,3F)-O2 | 3.0% |

Characteristics of this composition were measured to be as follows:

$T_C$=78.8 (° C.)
$T_L$<−20° C.

Δn=0.089
Δε=−3.5
η_{20}=27.0 (mPa·s)

EFFECT OF THE INVENTION

As explained above, the present invention can provide a liquid crystal composition with the characteristics satisfying various properties required for AM-LCD and having a suitable value of Δn in compliance with a cell thickness, particularly a negative and absolutely large value of dielectric anisotropy, a wide nematic liquid crystal phase range, a high voltage-holding ratio, and a low viscosity.

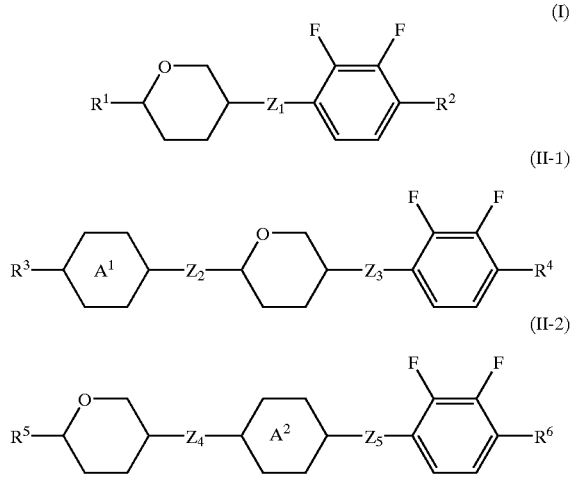

wherein $R^1$, $R^3$ and $R^5$ each independently represent an alkyl group having 1 to 10 carbon atoms or an alkenyl group having 2 to 10 carbon atoms; $R^2$, $R^4$ and $R^6$ each independently represent an alkyl group or an alkoxy group having 1 to 10 carbon atoms, or an alkenyl group having 2 to 10 carbon atoms; $Z_1$ to $Z_5$ each independently represent a single bond or $-CH_2CH_2-$; rings $A^1$ and $A^2$ each independently represent a 1,4-phenylene group or a trans-1,4-cyclohexylene group; and in the case that the ring $A^2$ is the 1,4-phenylene group, at least one hydrogen atom at a lateral position of the ring may be substituted with a fluorine atom.

We claim:

1. A liquid crystal composition comprising, as a first component, at least one compound selected from the compounds expressed by the general formula (I), and, as a second component, at least one compound selected from the.

2. A liquid crystal composition as described in claim 1 wherein the amounts of the first component and the second component are 3 to 40% by weight and 3 to 70% by weight based on the total weight of the liquid crystal composition, respectively.

3. A liquid crystal composition as described in claim 1 or 2 wherein the liquid crystal composition further comprises, as a third component, at least one compound selected from the compounds expressed by the general formulas (III-1), (III-2), (III-3), (III-4), (III-5) and (III-6):

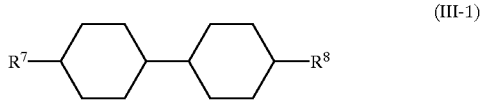

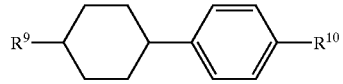

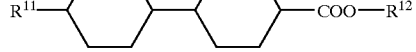

wherein $R^7$, $R^9$, $R^{11}$, $R^{13}$, $R^{15}$ and $R^{17}$ each independently represent an alkyl group having 1 to 10 carbon atoms or an alkenyl group having 2 to 10 carbon atoms; $R^8$, $R^{10}$, $R^{12}$, $R^{14}$ and $R^{16}$ each independently represent an alkyl group or an alkoxy group having 1 to 10 carbon atoms, or an alkenyl group having 2 to 10 carbon atoms; $R^{18}$ represents an alkyl group having 1 to 10 carbon atoms in which one $-CH_2-$ may be replaced by $-O-$, or an alkenyl, group having 2 to 10 carbon atoms; and Q represents a hydrogen atom or a fluorine atom.

4. A liquid crystal composition as described in claim 3 wherein the amounts of the first component, the second component and the third component are 3 to 40% by weight, 3 to 70% by weight and 1 to 80% by weight based on the total weight of the liquid crystal composition, respectively.

5. A liquid crystal composition as described in claim 3 wherein the liquid crystal composition further comprises, as a fourth component, at least one compound selected from the compounds expressed by the general formulas (IV-1) and (IV-2):

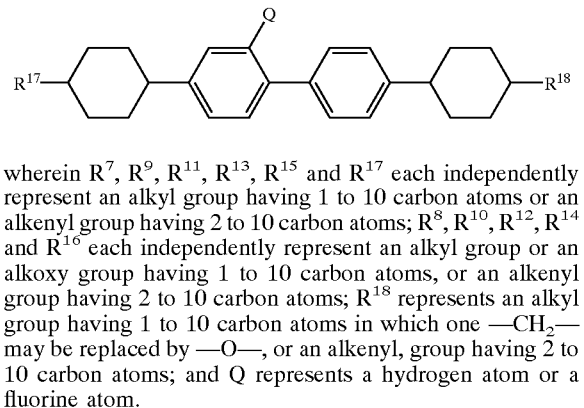

wherein $R^{19}$ and $R^{21}$ each independently represent an alkyl group having 1 to 10 carbon atoms;or an alkenyl group having 2 to 10 carbon atoms; $R^{20}$ and $R^{22}$ each independently represent an alkyl group or an alkoxy group having 1 to 10 carbon atoms, or an alkenyl group having 2 to 10 carbon atoms; $Z_6$ to $Z_8$ each independently represent a single bond or $-CH_2CH_2-$; and a ring B represents a 1,4-phenylene group or a trans-1,4-cyclohexylene group.

6. A liquid crystal display element comprising a liquid crystal composition as recited in claim 1 or 2.

7. A liquid crystal composition as described in claim 4 wherein the liquid crystal composition further comprises, as a fourth component, at least one compound selected from the compounds expressed by the general formulas (IV-1) and (IV-2):

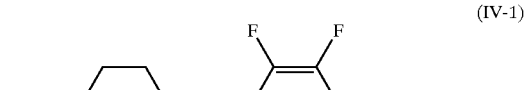
(IV-1)

(IV-2)

wherein $R^{19}$ and $R^{21}$ each independently represent an alkyl group having 1 to 10 carbon atoms or an alkenyl group having 2 to 10 carbon atoms; $R^{20}$ and $R^{22}$ each independently represent an alkyl group or an alkoxy group having 1 to 10 carbon atoms, or an alkenyl group having 2 to 10 carbon atoms; $Z_6$ to $Z_8$ each independently represent a single bond or —$CH_2CH_2$—; and a ring B represents a 1,4-phenylene group or a trans-1,4-cyclohexylene group.

8. A liquid crystal display element comprising a liquid crystal composition as recited in claim 3.

9. A liquid crystal display element comprising a liquid crystal composition as recited in claim 4.

10. A liquid crystal display element comprising a liquid crystal composition as recited in claim 5.

11. A liquid crystal display element comprising a liquid crystal composition as recited in claim 7.

* * * * *